United States Patent [19]

Carlson

[11] 4,431,162
[45] Feb. 14, 1984

[54] LOW PROFILE CONE VALVE ASSEMBLY

[75] Inventor: Edwin S. Carlson, St. Charles, Mo.

[73] Assignee: ACF Industries Incorporated, New York, N.Y.

[21] Appl. No.: 296,274

[22] Filed: Aug. 26, 1981

Related U.S. Application Data

[62] Division of Ser. No. 134,231, Mar. 26, 1980, Pat. No. 4,318,531.

[51] Int. Cl.³ ............................................. F16K 51/00
[52] U.S. Cl. .................................. 251/144; 251/292; 137/797
[58] Field of Search ...................... 251/144, 310, 292; 137/797

[56] References Cited

U.S. PATENT DOCUMENTS

| | | | |
|---|---|---|---|
| 1,526,890 | 2/1925 | Wilson | 251/144 |
| 1,570,637 | 1/1926 | Nordstrom | 251/144 |
| 2,045,758 | 6/1936 | Crossen, Jr. | 251/144 |
| 2,191,815 | 2/1940 | Clade | 251/144 |
| 4,158,453 | 6/1979 | Reedy | 251/144 |
| 4,187,881 | 2/1980 | Kull | 251/144 |

Primary Examiner—A. Michael Chambers
Attorney, Agent, or Firm—Henry W. Cummings

[57] ABSTRACT

In accordance with the present invention, a container outlet valve assembly (10) is provided including a generally cone-shaped housing (12) extending upwardly into the container, and including radially spaced openings (14) in the housing for lading to flow out of the container. A cone valve (30) is located within the housing containing spaced openings (34) which align with the openings (14) in the cone housing when the cone valve is in open position. A liner (36) of low friction material is attached to the outer surface of the cone valve and/or the inner surface of the cone housing. The cone valve is rotatable to a closed position in which the valve body closes the openings located in the housing (FIG. 3). An unloading chamber (44) is located below the cone valve and is attached to a tank mounting flange (18) with shearable fasteners (24). The flange does not extend below the tank bottom in excess of one (1) inch. Thus, a skid is not required to comply with AAR Regulations concerning projection below the tank body. In one embodiment (FIG. 1) an operating shaft (64) for the cone valve extends up through the unloading spout and engages a connection portion (84) formed in the upper, inner surface of the cone valve. In another embodiment (FIG. 2) an operating shaft (90) for the cone valve extends down from the top of the tank and extends through the valve housing and engages a connection portion in the upper portion of the cone valve. With the exception of the relatively small shaft cross section (64) in the bottom operated embodiment, the flow path from the cone valve into the unloading spout is unobstructed, thereby facilitating lading flow out of the cone valve and avoiding surfaces for lading to hang up.

5 Claims, 5 Drawing Figures

U.S. Patent  Feb. 14, 1984  4,431,162
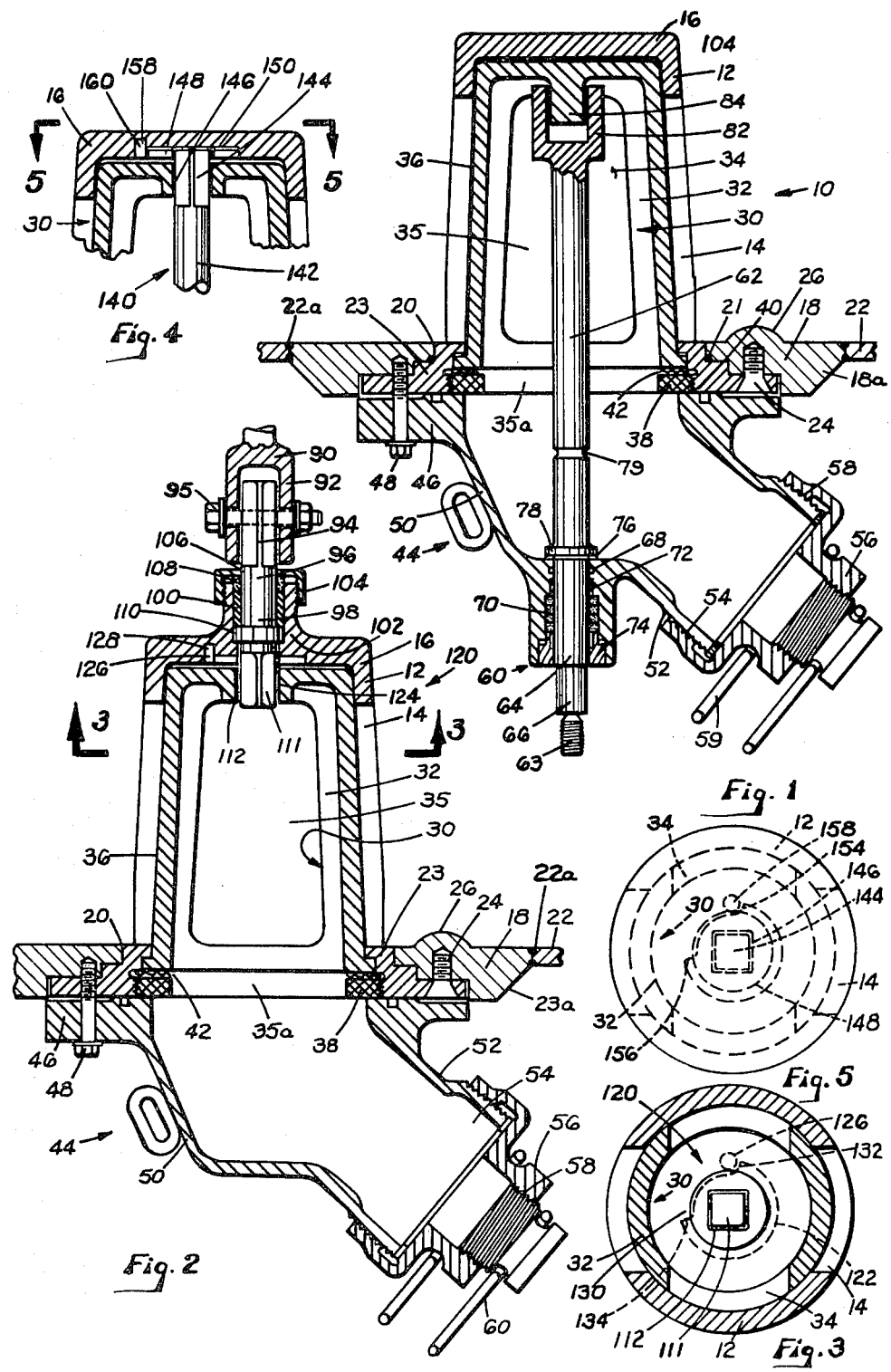

LOW PROFILE CONE VALVE ASSEMBLY

This is a division, of application Ser. No. 134,231, filed Mar. 26, 1980, now U.S. Pat. No. 4,318,531, issued Mar. 9, 1982.

BACKGROUND OF THE INVENTION

In U.S. Pat. No. 4,187,881 granted Feb. 12, 1980, assigned to the same assignee as the present application, a container outlet is disclosed including a generally coneshaped housing extending upwardly into the container, and including radially spaced outer openings in the cone for lading to flow out of the container. A cone valve is located within the housing containing spaced openings which align with the outer openings in the cone housing when the cone valve is in open position. A liner of low friction material is attached to the outer surface of the cone valve and/or the inner surface of the cone housing. The cone valve is rigidly attached to a vertically extending shaft which is journaled for rotation in a bearing in the cone housing. A hub extends radially outwardly from the lower portion of the shaft to the cone valve. The cone valve is rotatable to a closed position in which the valve body closes the openings located in the cone valve housing.

However, the hub disclosed in this application extends into the flow path of lading flowing out of the outlet. Thus the hub tends to reduce the rate of unloading achievable with a given size outlet. Also, this hub provides an area where lading can hang up.

Furthermore, in the embodiment where an unloading spout is used to unload the lading, the mounting arrangement for the unloading spout and the cone valve assembly includes a skid which adds weight and expense to the outlet.

SUMMARY OF THE INVENTION

One object of the present invention is to provide an improved cone valve assembly having improved flow characteristics.

Another object is to provide an improved cone valve assembly which does not require a skid in order to comply with AAR and DOT Regulations concerning projections extending below the bottom of railway tank cars.

Another object of the present invention is to provide an improved cone valve assembly having fewer parts than the assembly disclosed in U.S. Pat. No. 4,187,881.

In accordance with the present invention, a container outlet valve assembly is provided including a generally cone-shaped housing extending upwardly into the container, and including radially spaced openings in the housing for lading to flow out of the container. A cone valve is located within the housing containing spaced openings which align with the openings in the housing when the cone valve is in open position. A liner of low friction material is attached to the outer surface of the cone valve and/or the inner surface of the cone housing. The cone valve is rotatable on a bearing in the cone housing. The cone valve is rotatable to a closed position in which the valve body closes the openings located in the cone valve housing. A rotation of about 90 degrees will move the cone valve between open and closed positions.

An unloading chamber is located below the cone valve and is attached to a tank mounting flange with shearable fasteners. The flange does not extend below the tank bottom in excess of one (1) inch. Thus a skid is not required in order to comply with AAR and DOT regulations concerning projections below the tank bottom.

In one embodiment an operating shaft for the cone valve extends up through the unloading chamber and engages a connection portion formed in the cone valve.

In another embodiment an operating shaft for the cone valve extends down from the top of the tank and extends through the valve housing and engages a connection portion in the upper portion of the cone valve.

With the exception of the relatively small shaft cross section in the bottom operated embodiment, the flow path from the cone valve into the unloading spout is unobstructed, thereby facilitating lading flow out of the cone valve and avoiding surfaces for lading to hang up.

Means are provided preventing more than a 90 degrees movement between open and closed positions.

THE DRAWINGS

FIG. 1 is a vertical section view of one embodiment of the cone valve assembly of the present invention involving bottom operation;

FIG. 2 is a vertical sectional view of another embodiment of the present invention illustration top operation;

FIG. 3 is a sectional view looking in the direction of the arrows along the line 3—3 in FIG. 2;

FIG. 4 is a modification of the bottom operation arrangement illustrated in FIG. 1; and FIG. 5 is a view looking in the direction of the arrows along the line 5—5, FIG. 4.

DESCRIPTION OF PREFERRED EMBODIMENTS p In the drawings a cone valve assembly 10 includes a housing 12 having a plurality of circumferentially spaced openings 14. Housing 12 is attached to or is integral with a top portion 16. A flange portion 23 of housing 12 extends into an opening 20 in a tank flange 18. Flange 18 is located within an opening 22a in tank bottom 22. Flange portion 23 of housing 12 is held in place within flange 18 by means of countersunk fasteners 24. Bottom flange 18 is tapered at 18a to the extent its thickness exceeds one (1) inch. To the extent necessary to carry the weight of the lading, additional material in the form of knobs 26 may be provided at locations above fasteners 24.

A cone valve 30 includes a body portion 32 located within housing 12. Body portion 32 includes a plurality of circumferentially spaced openings 34 which in open position align with openings 14 in the valve housing and which in closed position are circumferentially spaced from openings 14 so that the body portion of the cone valve closes openings 14. Openings 34 are in fluid connection with a hollow center portion 35 and a bottom opening 35a. A layer of low friction material 36 is located upon cone valve 32 to make a positive seal with housing 12 and to facilitate rotation of the cone valve between open and closed positions. A seal 21 is located between housing flange portion 23 and tank bottom flange 18.

Reference may be made to U.S. Pat. No. 4,187,881 for a description of the operation of cone valve 30 and housing 12. A cone valve bearing and retainer 38 is located within flange 23 of housing 12 and is provided with threads 40 or other attachment means to hold bearing and retainer 38 in place. A layer of low-friction material 42 is located between bearing and retainer 38 and cone valve 30, and acts as a spring to maintain a constant pressure urging valve 30 into housing 12.

An unloading chamber 44 includes a flange portion 46 which is attached to flange portion 23 with shearable fasteners 48 located at a position circumferentially spaced from fasteners 24. Unloading chamber 44 includes a body portion 50 which is hollow and which communicates with cone valve bottom opening 35a and with a discharge spout 52 having an opening 54 which is closed by a cap 56. Threads 58 hold the cap in place on discharge spout 52. A chain 59 attached to cap 56 and to body portion 50 ensures the cap 56 will not be lost when it is removed for unloading of the lading.

An operator assembly 60 includes a shaft 62 having a bearing and seal portion 64, a depending portion 66 and a threaded connection portion 63. The threaded portion is used to attach an operating wrench or handle. The shaft extends through the unloading spout 44, through an O ring seal 68, a packing 70 and guide 72. A threaded packing gland nut 74 holds this assembly in place within the unloading spout. A thrust washer 76 is engaged by a shoulder 78 on shaft 64.

Shaft 62 further includes a shear groove 79. Shaft 62 passes upwardly into cone valve 30 and includes a connection portion 82 of non-round configuration which engages a non-round projection 84 from cone valve 30. It will be apparent that rotation of operator shaft 62 by connection portion 63 will in turn rotate non-round projection 84 and cone valve 30 between open and closed positions.

It will be apparent that the flow path of the lading from cone valve 30 through bottom opening 35a into discharge spout 44 is relatively unobstructed except for the cross section of shaft 62. This is to be contrasted with the construction shown in U.S. Pat. No. 4,187,881 wherein the hub attached to the operating shaft obstructs a significant amount of the opening from the cone valve into the discharge spout.

Furthermore, the use of the flange 18 located within the tank bottom 22 and tapered to the extent its thickness exceeds one (1) inch, and the shearable fasteners 48 which attach the outlet chamber 44 to the flange 23 do not require a skid to comply with AAR and DOT regulations concerning projections extending more than one (1) inch below the tank bottom. Thus a savings in weight and cost of the skid is achieved with the construction of the present invention.

In another embodiment of the present invention shown in FIG. 2, an operating shaft 90 with non-round socket portion 92 at its lower end extends downwardly from the top of the tank. This shaft engages non-round portion 94 and pin 95 of operating shaft 96. The shaft includes a lower portion 98 which extends through a packing gland 100 located above housing top portion 16. In this embodiment, housing top 16 includes an extension 102 to house the packing gland. A threaded cap 104 having an opening 106 holds the packing 100 and packing sleeve 108 in place. Shaft portion 98 extends through an opening 110 in housing top 16 and includes a non-round portion 111 which engages a non-round opening 112 in cone valve 30.

The construction is otherwise the same as in FIG. 1 with the exception that operating assembly 60 including shaft 62 and the packing gland assembly in unloading spout 44 is eliminated.

Stop means indicated generally at 120 in FIGS. 2 and 3 are provided to control rotation of the cone valve relative to the valve housing between open and closed positions. This stop means comprises a stop washer 122 drivably connected to shaft portion 111 by means of non-round opening 124. A pin 126 is located in an opening 128 in housing top portion 16. A slot 130 is located in the external surface of the stop washer 122. The stop washer includes stop walls 132 and 134. When the cone valve 30 is in the closed position as illustrated in FIGS. 2 and 3, the stop pin 126 abuts the surface 132 of the stop washer. When the shaft 90 is used to rotate the cone valve into the open position where in openings 34 of the cone valve align with housing opening 14, the stop washer is rotated until the surface 134 engages the stop pin 126. Thus the operator will know how far to rotate a shaft 90 in order to move the cone valve into the open position.

Another embodiment of the invention for bottom operation is illustrated in FIGS. 4 and 5. In this embodiment a operating assembly 140 includes an operating shaft 142 constructed in the same manner as shaft 62 and FIG. 1 and extending through an unloading chamber 44 and packing plan assembly 70 as illustrated in FIG. 1. This operating handle 142 includes a non-round connection portion 144 which engages a non-round opening 146 in cone valve 30. Non-round shaft portion 144 is drivably connected to a stop washer 148 having a non-round opening 150. Stop washer 148 includes a slot 152 and a pair of stop walls 154 and 156 similar to walls 132 and 134 in FIG. 3. A stop pin 158 is mounted in a slot 160 in housing top portion 16.

The operation is the same as in FIGS. 2 and 3. When handle 142 is rotated, non-round portion 144 moves cone valve 30 between open and closed positions and moves stop washer 148 from a position in which wall 154 of stop washer engages pin 126 to the open position wherein wall 154 engages pin 126. Rotation of shaft 142 in the opposite direction causes the cone valve to return to the closed position and stop washer to return to the position shown in FIG. 5 wherein stop washer wall 154 again engages stop pin 150.

What is claimed is:

1. In a container outlet valve assembly comprising: a generally cone shaped housing extending upwardly into the container; the apex of said housing extending upwardly into the container; radially spaced outer openings in the housing for lading to flow out of the container; a cone valve located within the housing containing a valve body and spaced cone valve openings in said valve body which align with the outer openings in the cone housing when the cone valve is in open position; said container including a tank bottom flange having an annular groove, and said housing including a housing flange located within said annular groove; said cone valve being rotatable upon a bearing integrally connected to said housing flange and located adjacent said annular groove, and extending only a short distance radially inwardly; a liner of low friction material attached to one of the outer surfaces of the cone valve and/or the inner surface of the cone housing and sealing said cone valve with respect to said cone valve housing; said cone valve being rotatable from said open position to a closed position in which said valve body closes the openings located in the cone valve housing; said cone valve having a hollow center portion in communication with said cone valve openings and having a bottom opening; an unloading chamber located below the cone valve and said bottom opening and attached to a tank mounting flange with shearable fasteners which define a shear plane; said mounting flange, said housing flange, and said bearing all being located above said shear plane; said chamber being in fluid communication with said bottom opening; a top operating shaft for said cone valve engaging a connection portion formed in said cone valve adjacent said housing apex and extending upwardly to the tank top; whereby the flow path from the cone valve into the unloading chamber is unobstructed.

2. An improved container outlet valve assembly according to claim 1 wherein said housing includes an extension at the top which houses a packing gland for said top operating shaft and said housing includes an opening through which said top operating shaft passes to engage said connection portion.

3. An improved container outlet valve assembly according to claim 1 wherein said tank flange is thicker than one (1) inch and is tapered in the portion exceeding one (1) inch.

4. An improved container outlet valve assembly according to claim 1 wherein stop means are provided which engage when said cone valve is in the full open position and in the fully closed position.

5. An improved container outlet valve assembly according to claim 4 wherein said stop means includes a pin depending from said housing and a stop washer drivably connected to a shaft and having a slot and opposite washer walls at either end of said slot which said pin engages respectively in said open and closed positions.

* * * * *